C. FOGELBERG.
Meat-Cutter.
No. 162,909.
Patented May 4, 1875.
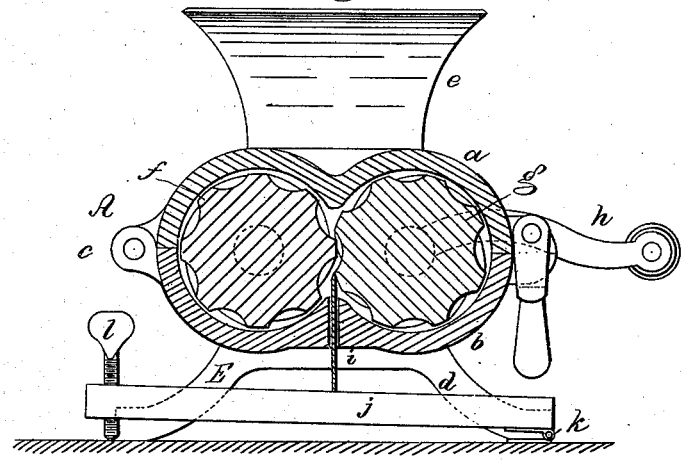
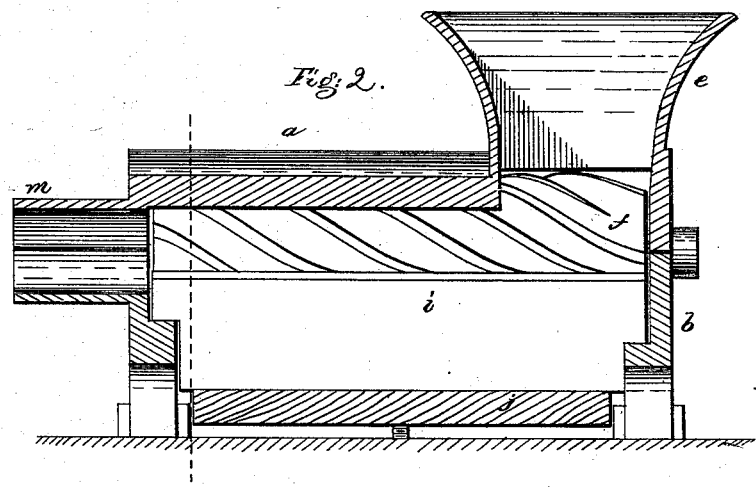
Witnesses.
L. H. Latimer,
Wm Pratt.
Inventor.
Carl Fogelberg
PER Crosby Gregory
Att'ys.

UNITED STATES PATENT OFFICE.

CARL FOGELBERG, OF CAMBRIDGEPORT, ASSIGNOR TO HIMSELF AND OSCAR A. JOHNSON, OF BOSTON, MASSACHUSETTS.

IMPROVEMENT IN MEAT-CUTTERS.

Specification forming part of Letters Patent No. 162,909, dated May 4, 1875; application filed April 7, 1875.

*To all whom it may concern:*

Be it known that I, CARL FOGELBERG, of Cambridgeport, in the county of Middlesex and State of Massachusetts, have invented an Improved Meat-Cutter, of which the following is a specification:

This invention relates to meat-cutters of the class in which two spirally-fluted or grooved cylinders meshing each into the other seize the meat fed to them through a hopper and carry it forward, cutting it in its travel through the machine by pressing it on a knife located at the point where the peripheries of the two cylinders or rollers meet.

My invention consists in a knife adapted to fit a slot made through the lower half of the shell or case of the cutter, and combined with a lever and set-screw for adjusting the lever and knife, as hereinafter described.

Figure 1 is a cross-section of a meat-cutter, showing my invention, and Fig. 2 is a longitudinal section thereof.

A is the case or shell of the cutter, consisting of two parts, $a$ $b$, hinged at $c$, the part $b$ being provided with legs or feet $d$, and the part $a$ with a hopper, $e$, for receiving the meat. The roller $f$ rests in bearings in the part $b$, and is moved through the spiral projections on roller $g$, which engage the spiral projections on roller $f$, the roller $g$ being turned by a handle $h$. The part $b$ is slotted centrally, as shown, to receive a knife-blade, $i$, the lower edge of the knife-blade resting on a lever, $j$, hinged or pivoted at $k$, and adjustable by a thumb-screw, $l$, or eccentric turn-button. The meat is delivered at the spout $m$.

With this class of machines it is often necessary to sharpen the knife, and when worn away the meat is not cut sufficiently fine, so the knife, to work properly, must be elevated from time to time to correct cutting position. By cutting a slot entirely through the bottom of the shell the knife may be easily inserted and withdrawn, and there is no chance for the meat to get under the knife, throwing it out of true position, as would be the tendency if the knife rested only in a groove in $b$; and, further, by allowing the lower edge of the knife-blade to extend entirely through the slot in the bottom of $b$, and there resting it on a lever, I am enabled easily and quickly to adjust the knife higher or lower without removing the machine, turning it over, or stopping its motion, and I am also enabled to get a greater depth of knife-blade, and one that will consequently last longer before worn out, than would a knife only the width sufficient to rest in a groove in the shell $b$. The lever and knife can be adjusted as little or as much as desired by simply turning the thumb-screw $l$.

I do not claim anything shown in patent No. 23,246.

I claim—

The combination, with a meat-cutter, substantially as described, of the knife $i$, and an adjustable lever on which the knife rests, the knife being adapted to be adjusted within a slot extending entirely through the lower portion of the shell of the cutter, substantially as set forth.

In testimony whereof I have signed my name to this specification in the presence of two subscribing witnesses.

CARL FOGELBERG.

Witnesses:
G. W. GREGORY,
WM. PRATT.